(12) United States Patent
May

(10) Patent No.: US 10,532,703 B2
(45) Date of Patent: Jan. 14, 2020

(54) CAR DOOR UPHOLSTERY PROTECTIVE SHIELD AND METHOD OF USE OF THE SAME

(71) Applicant: Henry W May, Nanaimo (CA)

(72) Inventor: Henry W May, Nanaimo (CA)

( * ) Notice: Subject to any disclaimer, the term of this patent is extended or adjusted under 35 U.S.C. 154(b) by 0 days.

(21) Appl. No.: 16/069,357

(22) PCT Filed: Jan. 12, 2016

(86) PCT No.: PCT/CA2016/050025
§ 371 (c)(1),
(2) Date: Jul. 11, 2018

(87) PCT Pub. No.: WO2017/120656
PCT Pub. Date: Jul. 20, 2017

(65) Prior Publication Data
US 2019/0016275 A1    Jan. 17, 2019

(51) Int. Cl.
*B60R 13/02* (2006.01)
*A01K 1/035* (2006.01)

(52) U.S. Cl.
CPC .......... *B60R 13/0243* (2013.01); *A01K 1/035* (2013.01)

(58) Field of Classification Search
CPC ............................ B60R 13/0243; A01K 1/035
USPC .................................................. 296/153, 39.1
See application file for complete search history.

(56) References Cited

U.S. PATENT DOCUMENTS

| 2,690,350 | A | * | 9/1954 | Shapiro | B60J 10/75 296/153 |
| 2,738,220 | A | * | 3/1956 | Simmons | B60N 2/783 296/153 |
| 4,758,043 | A | * | 7/1988 | Reynaldos | B60J 9/00 296/153 |
| 5,004,292 | A | | 4/1991 | Horne | |
| 5,827,595 | A | * | 10/1998 | Jones | B29C 51/145 428/71 |
| 6,000,365 | A | * | 12/1999 | Charnesky | A01K 1/035 119/706 |
| 6,840,566 | B2 | * | 1/2005 | Bruton | B60N 2/783 296/153 |

(Continued)

OTHER PUBLICATIONS

International Search Report Corresponding to PCT/CA2016/050025 dated Sep. 19, 2016.

(Continued)

*Primary Examiner* — Gregory A Blankenship
(74) *Attorney, Agent, or Firm* — Michael J. Bujold; Davis & Bujold, PLLC

(57) ABSTRACT

A car door upholstery protective shield includes a one piece resilient body. The body includes a spine having a first end, a second end, a first side edge and a second side edge. A protective sheet depends downwardly from the first side edge. A first door engagement tab on the second side edge projects outwardly past the first end. A second door engagement tab on the second side edge projects outwardly past the second end. A cutaway gripping area in the spine creates a flex region in the spine, such that manual upward pressure in the gripping area causes the spine to bow upwardly in the flex region to bring the first end and the second end closer together and upon release of the manual pressure the spine resiliently returns to original shape and length.

3 Claims, 4 Drawing Sheets

(56) References Cited

U.S. PATENT DOCUMENTS

| | | | |
|---|---|---|---|
| 6,926,341 B1* | 8/2005 | Addesso | B60R 11/00 |
| | | | 119/712 |
| 6,981,735 B1* | 1/2006 | Stephens | B60N 2/753 |
| | | | 296/153 |
| 7,404,589 B2* | 7/2008 | Carter | B60J 11/025 |
| | | | 296/153 |
| 9,402,369 B2* | 8/2016 | Burns Baker | B60R 7/046 |
| 2011/0080015 A1 | 4/2011 | Spiegel et al. | |
| 2015/0173325 A1* | 6/2015 | Burns Baker | B60R 7/046 |
| | | | 296/1.09 |
| 2019/0016275 A1* | 1/2019 | May | A01K 1/0272 |

OTHER PUBLICATIONS

Written Opinion Corresponding to PCT/CA2016/050025 dated Sep. 19, 2016.

* cited by examiner

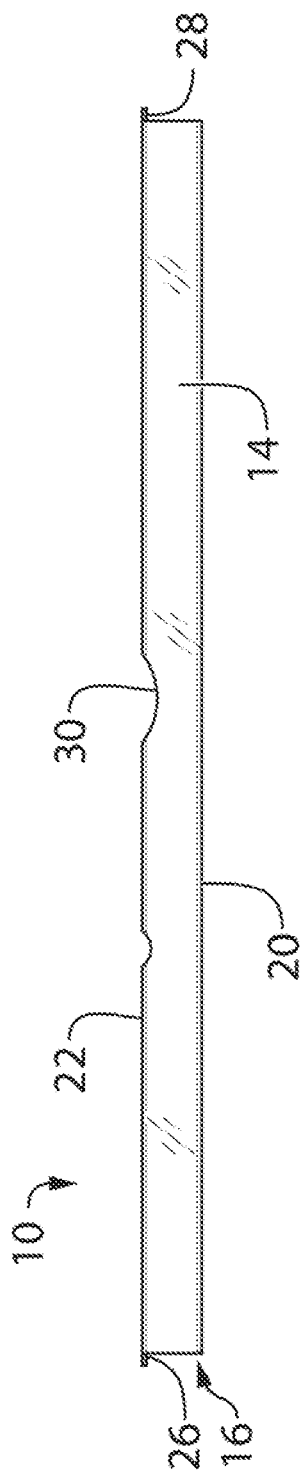
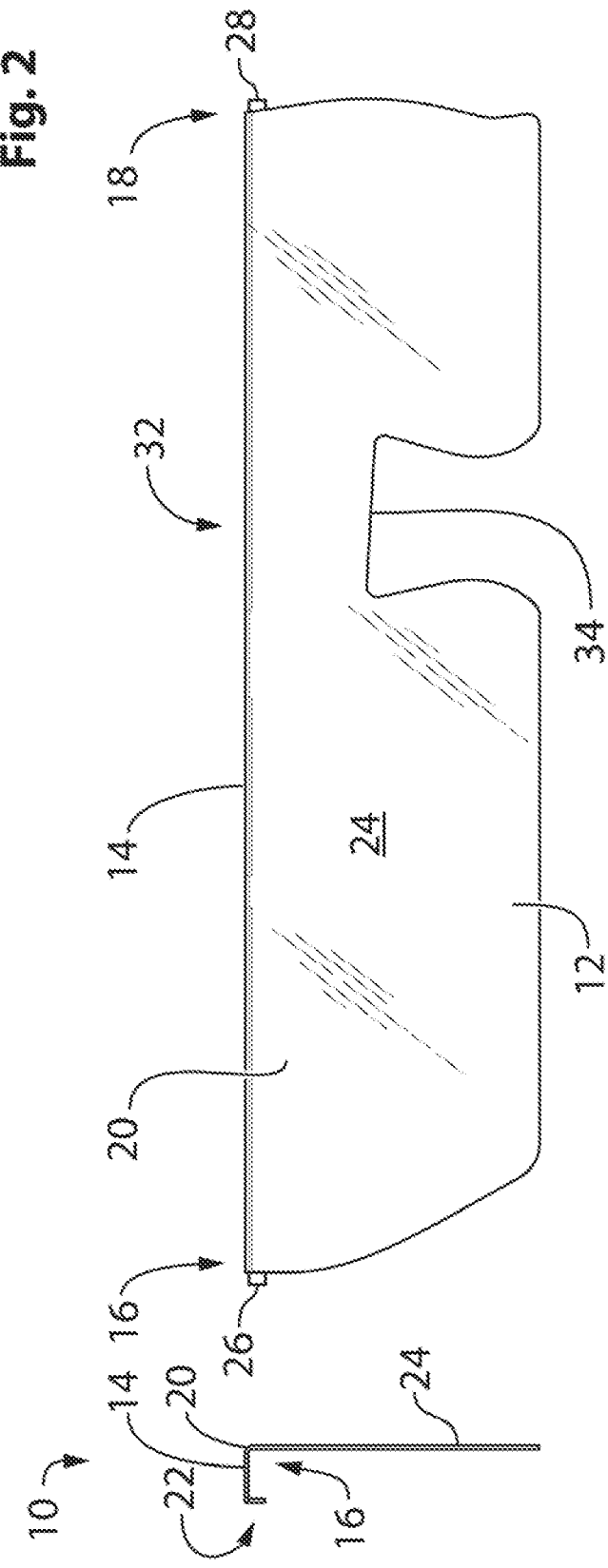

CAR DOOR UPHOLSTERY PROTECTIVE SHIELD AND METHOD OF USE OF THE SAME

FIELD

There is described a protective shield that is intended to prevent a pet, typically a dog, from damaging upholstery on a car door.

BACKGROUND

A dog is territorial by nature. When a dog, that has been left alone in a car, sees another animal outside of the car; the dog will react. Unfortunately, this frequently results in damage being caused to upholstery on the car door. U.S. Pat. No. 6,926,341 (Addesso et al) and U.S. Pat. No. 6,000,365 (Charnesky) disclose forms of car door upholstery protective shields that are suspended from the window well to prevent such damage from occurring to the upholstery on the car door.

SUMMARY

According to one aspect there is provide a car door upholstery protective shield which includes a one piece resilient body. The body includes a spine having a first end, a second end, a first side edge and a second side edge. A protective sheet depends downwardly from the first side edge. A first door engagement tab on the second side edge projects outwardly past the first end. A second door engagement tab on the second side edge projects outwardly past the second end. A cutaway gripping area in the spine creates a flex region in the spine, such that manual upward pressure in the gripping area causes the spine to bow upwardly in the flex region to bring the first end and the second end closer together and upon release of the manual pressure the spine resiliently returns to original shape and length.

According to another aspect there is provided a method of protecting car door upholstery. The method involves providing a protective shield as described above. The method then involves a step of exerting manual upward pressure in the gripping area to cause the spine to bow upwardly in the flex region to bring the first end and the second end closer together and inserting the spine into the window frame with the protective sheet covering the car door upholstery. The method finally involves a step of releasing the manual upward pressure on the spine and allowing the spine to resiliently return to original shape and length with the first door engagement tab at the first end of the spine engaging a first inside side edge of the window frame and the second door engagement tab at the second end of the spine engaging a second inside side edge of the window frame. The first door engagement tab and the second door engagement tab serve to lock the spine from removal from the window frame of the door.

The Applicant was not satisfied with the performance of car door upholstery protective shields that were suspended from the window well. It was the Applicant's experience that the dogs repeated impact against the protective shields tended to dislodge them. What was required was a manner of locking the protective shields in place, so that the dogs could not and did not dislodge them. This was accomplished by creating a flex region on the spine and end tabs. The flex regions allows the spine to be manipulated to resiliently bow upwardly during insertion. The end tabs lock the body against removal.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1 is an end elevation view of a car door upholstery protective shield.

FIG. 2 is a top plan view of the car door upholstery protective shield of FIG. 1.

FIG. 3 is a side elevation view of the car door upholstery protective shield of FIG. 1.

DETAILED DESCRIPTION

Figure 4:
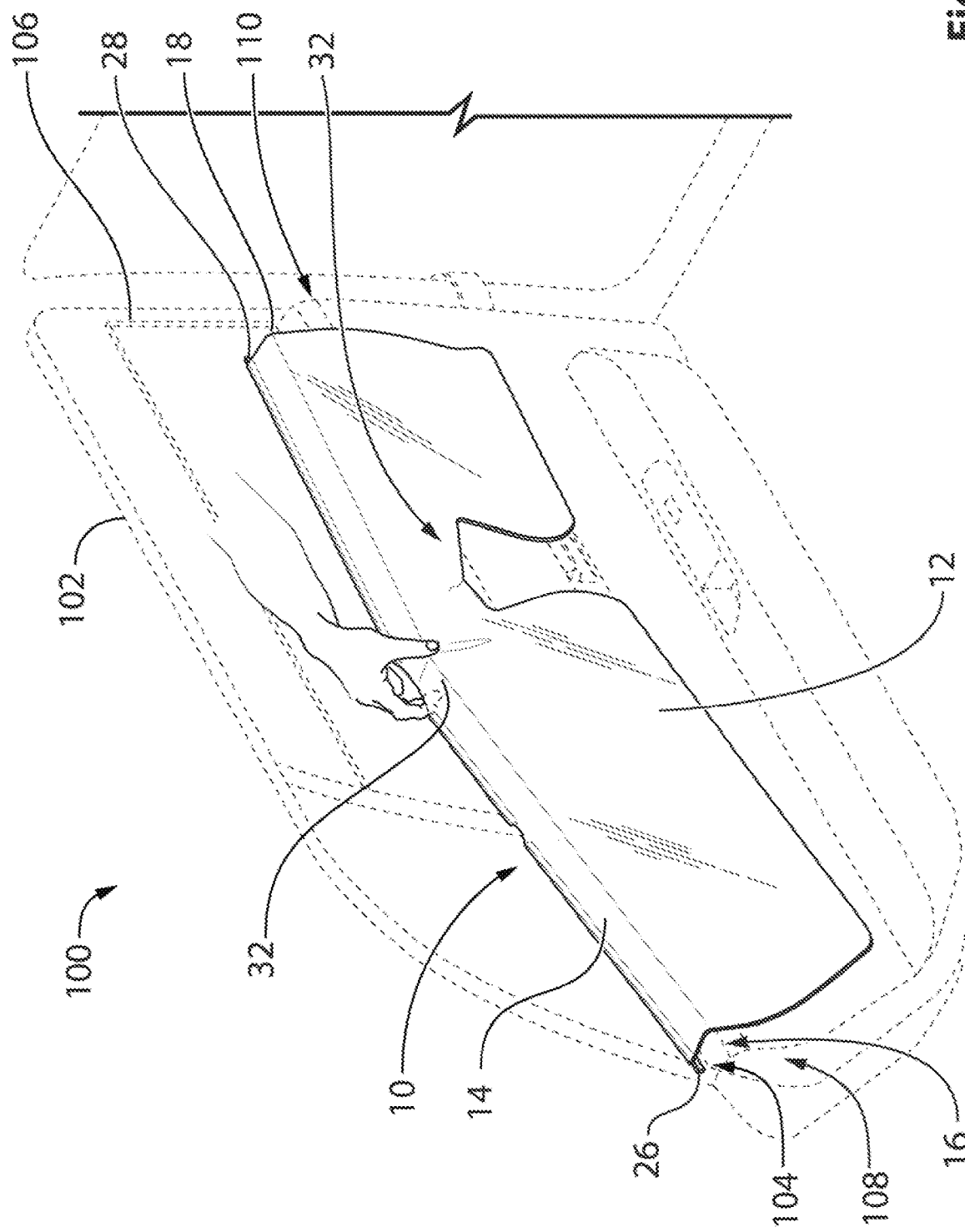
FIG. 4 is a perspective view of the car door upholstery protective shield of FIG. 1 being flexed during installation on a car door.

A car door upholstery protective shield, generally identified by reference numeral 10, will now be described with reference to FIG. 1 through 6.

Figure 5:
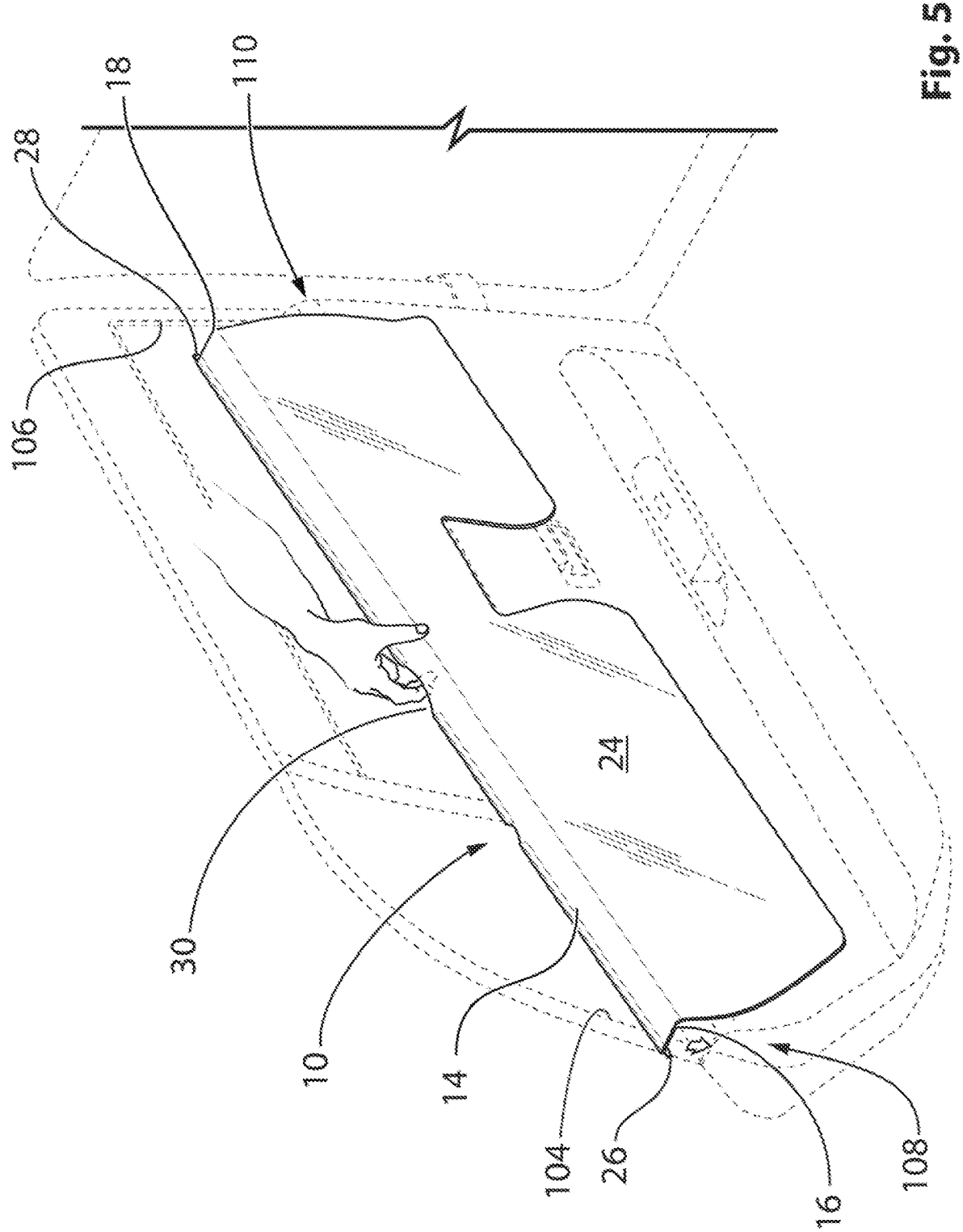
FIG. 5 is a perspective view of a first engagement tab of the car door upholstery protective shield of FIG. 1 being engaged during installation on the car door.
Figure 6:
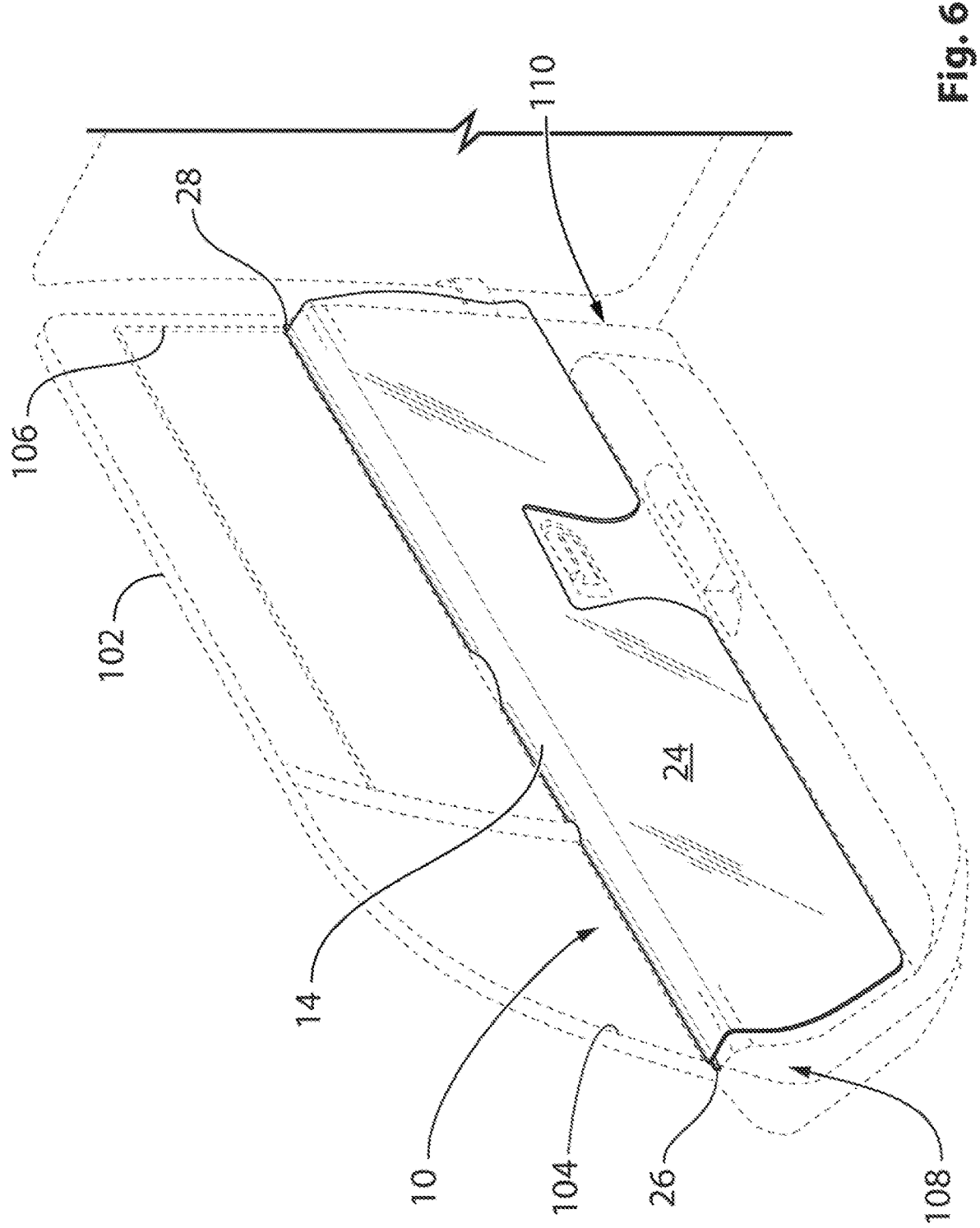
FIG. 6 is a perspective view of the car door upholstery protective shield of FIG. 1 locked in position on the car door.

Structure and Relationship of Parts:

Referring to FIG. 1 through FIG. 3, car door upholstery protective shield 10 is made from a one piece resilient body 12. Referring to FIG. 2, body 12 includes a spine 14 having a first end 16, a second end 18, a first side edge 20 and a second side edge 22. Referring to FIG. 3, a protective sheet 24 depends downwardly from first side edge 20. The length of protective sheet 24 may vary. At a minimum one wants to cover area just below the window frame, where it is anticipated a dog will position itself. A first door engagement tab 26 on second side edge 22 projects outwardly past first end 16. A second door engagement tab 28 on second side edge 22 projects outwardly past second end 18. Referring to FIG. 2, a cutaway gripping area 30 is provided in spine 14 along second side edge 22. Referring to FIG. 4, cutaway gripping area 30 creates a flex region in spine 14, generally indicated by reference numeral 32. Manual upward pressure in gripping area 30 causes spine 14 to bow upwardly in flex region 32 to bring first end 16 and second end 18 closer together. Referring to FIG. 5 and FIG. 6, upon release of the manual upward pressure, spine 14 resiliently returns to original shape and length.

Referring to FIG. 3, it is preferred that the body 12 be transparent, so that car door upholstery protective shield 10 is unobtrusive and does not detract from the aesthetics of the upholstery. If protective sheet 24 does not end above the door handle, it is preferred that a door handle cut out 34 be provided in protective sheet 24. Referring to FIG. 4 through 6, door handle cut out 34 allows the car door handle can be accessed for the purpose of opening the car door.

Operation:

Referring to FIG. 4, there is illustrated a car door 100 have a window frame 102. Window frame 102 has a first inside side edge 104 and a second inside side edge 106. Car door 100 has a first outside side edge 108 and a second outside side edge 110. Flexing of spine 14 upwardly in flex region 32 facilitates insertion of spine 14 into window frame 102. Without this "shortening" by bowing upwardly in flex region 32, spine 14 of body 12 with first door engagement tab 26 and second door engagement tab 28 would be too long to fit within window frame 102. Referring to FIG. 5, during installation, first door engagement tab 26 at first end 16 of spine 14 engages first inside side edge 104 of window frame 102. Similarly, second door engagement tab 28 second end 18 of spine 14 engages second inside side edge 106 of window frame 102. Body 12 cannot be removed unless the procedure is reversed and spine 14 is "shortened" by bowing. However, first door engagement tab 26 and second door engagement tab 28 serve to lock spine 14 in position. Referring to FIG. 6, when in position, as described above, car door upholstery protective shield 10 is less likely to be dislodged or "bounced" out of position when a dog strikes it.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A car door upholstery protective shield, comprising:
   a one piece resilient body, comprising:
      a spine having a first end, a second end, a first side edge and a second side edge;
      a protective sheet depending downwardly from the first side edge;
      a first door engagement tab on the second side edge projecting outwardly past the first end;
      a second door engagement tab on the second side edge projecting outwardly past the second end; and
      a cutaway gripping area in the spine creates a flex region in the spine, such that manual upward pressure in the gripping area causes the spine to bow upwardly in the flex region to bring the first end and the second end closer together and upon release of the manual pressure the spine resiliently returning to original shape and length.

2. The car door upholstery protective shield of claim 1, in combination with a car door having a window frame, the manual upward pressure resulting in flexing of the spine upwardly in the flex region to facilitating insertion of the spine into the window frame, the release of the manual upward pressure on the spine resulting in the first door engagement tab at the first end of the spine engaging a first inside side edge of the window frame and the second door engagement tab at the second end of the spine engaging a second inside side edge of the window frame; the first door engagement tab and the second door engagement tab serving to lock the spine from removal from the window frame of the door.

3. A method of protecting car door upholstery, comprising:
   providing a one piece resilient body, comprising:
      a spine having a first end, a second end, a first side edge and a second side edge;
      a protective sheet depending downwardly from the first side edge;
      a first door engagement tab on the second side edge projecting outwardly past the first end;
      a second door engagement tab on the second side edge projecting outwardly past the second end; and
      a cutaway gripping area in the spine which creates a flex region in the spine;
   exerting manual upward pressure in the gripping area to cause the spine to bow upwardly in the flex region to bring the first end and the second end closer together and inserting the spine into the window frame with the protective sheet covering the car door upholstery;
   releasing the manual upward pressure on the spine and allowing the spine to resiliently return to original shape and length with the first door engagement tab at the first end of the spine engaging a first inside side edge of the window frame and the second door engagement tab at the second end of the spine engaging a second inside side edge of the window frame, the first door engagement tab and the second door engagement tab serving to lock the spine from removal from the window frame of the door.

* * * * *